United States Patent
Xiao et al.

(10) Patent No.: US 11,783,865 B2
(45) Date of Patent: Oct. 10, 2023

(54) METHOD AND APPARATUS FOR DISPLAYING VIDEO PLAYBACK PAGE, AND ELECTRONIC DEVICE AND MEDIUM

(71) Applicant: BEIJING BYTEDANCE NETWORK TECHNOLOGY CO., LTD., Beijing (CN)

(72) Inventors: Junpeng Xiao, Beijing (CN); Huijun Yu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/825,705

(22) Filed: May 26, 2022

(65) Prior Publication Data

US 2022/0284930 A1 Sep. 8, 2022

Related U.S. Application Data

(63) Continuation of application No. PCT/CN2020/127272, filed on Nov. 6, 2020.

(30) Foreign Application Priority Data

Dec. 12, 2019 (CN) .......................... 201911288907.1

(51) Int. Cl.
*G11B 27/34* (2006.01)
(52) U.S. Cl.
CPC .................................... *G11B 27/34* (2013.01)
(58) Field of Classification Search
CPC ..... G11B 27/34; G11B 27/031; G11B 27/034; G11B 27/10; G11B 27/102; G11B 27/105;
(Continued)

(56) References Cited

U.S. PATENT DOCUMENTS

| 2003/0103079 A1 | 6/2003 | Adatia et al. |
| 2013/0239039 A1 | 9/2013 | Kaleta et al. |

(Continued)

FOREIGN PATENT DOCUMENTS

| CN | 101719375 A | 6/2010 |
| CN | 103513913 A | 1/2014 |

(Continued)

OTHER PUBLICATIONS

Chinese Notice of Allowance issued in Chinese Application No. 201911288907.1.

(Continued)

*Primary Examiner* — Thai Q Tran
*Assistant Examiner* — Stephen R Smith
(74) *Attorney, Agent, or Firm* — ARENTFOX SCHIFF LLP

(57) ABSTRACT

Embodiments of the present disclosure disclose a method and apparatus for displaying a video playback page, an electronic device, and a medium. A specific implementation of the method includes: displaying the video playback page, where the video playback page includes a video playback view and a progress adjustment control for adjusting video playback progress; and updating a progress displayed in the progress adjustment control based on a playback progress of a currently played video in the video playback view at intervals of a target duration, where the target duration is determined based on a size of a screen of a video playback device and a total duration of the currently played video. This implementation realizes differentiation of callback duration for videos of different durations, thereby avoiding a video freeze caused by setting a fixed callback duration.

3 Claims, 8 Drawing Sheets

(58) Field of Classification Search
CPC .............. G11B 27/36; H04N 21/8456; H04N 21/8541; H04N 19/107; H04N 21/00; H04N 21/234381; H04N 21/2387; H04N 21/42646; H04N 21/4307; H04N 21/4524; H04N 21/4532; H04N 21/47202; H04N 21/47205; H04N 21/47217; H04N 21/4758; H04N 21/6587; H04N 5/76; H04N 5/93; H04N 7/17336; H04N 9/8042; A63F 13/47; G06F 2200/1614
USPC .......................... 345/173; 715/716; 386/241
See application file for complete search history.

(56) References Cited

U.S. PATENT DOCUMENTS

| | | | | |
|---|---|---|---|---|
| 2013/0298021 | A1* | 11/2013 | Park | G06F 3/04847 715/716 |
| 2014/0201633 | A1* | 7/2014 | Jiao | G06F 3/04855 715/716 |
| 2014/0208254 | A1* | 7/2014 | Lin | G11B 27/34 715/772 |
| 2014/0310601 | A1* | 10/2014 | Matejka | H04N 21/8153 715/720 |
| 2015/0370402 | A1* | 12/2015 | Checkley | G06F 3/0487 345/173 |
| 2016/0034574 | A1* | 2/2016 | Kang | H04N 21/4438 715/720 |
| 2016/0365126 | A1* | 12/2016 | Dali | H04N 21/8455 |
| 2017/0192642 | A1* | 7/2017 | Fishman | G06F 3/0485 |
| 2018/0121079 | A1* | 5/2018 | Li | G06F 3/04883 |
| 2019/0087074 | A1* | 3/2019 | Oh | G06F 3/04845 |
| 2019/0268631 | A1* | 8/2019 | Beaty | H04N 21/47217 |
| 2020/0037020 | A1* | 1/2020 | Raikar | H04N 21/42204 |
| 2020/0351564 | A1* | 11/2020 | Zhang | H04N 21/6587 |
| 2021/0098026 | A1* | 4/2021 | Bedi | G06V 10/761 |
| 2021/0181924 | A1* | 6/2021 | Park | G06F 3/04847 |

FOREIGN PATENT DOCUMENTS

| | | |
|---|---|---|
| CN | 103559117 A | 2/2014 |
| CN | 103646655 A | 3/2014 |
| CN | 103702220 A | 4/2014 |
| CN | 104301798 A | 1/2015 |
| CN | 104469515 A | 3/2015 |
| CN | 105472469 A | 4/2016 |
| CN | 106293410 A | 1/2017 |
| CN | 108170500 A | 6/2018 |
| CN | 109040819 A | 12/2018 |
| CN | 109743611 A | 5/2019 |
| CN | 110022493 A | 7/2019 |
| CN | 110996155 A | 4/2020 |

OTHER PUBLICATIONS

Chinese First Office Action issued in Chinese Application No. 201911288907.1.
Chinese Second Office Action issued in Chinese Application No. 201911288907.1.
International Search Report and Written Opinion issued in International Patent Application No. PCT/CN2020/127272 dated Feb. 18, 2021.
Office Action dated Aug. 1, 2023 in Japanese Application No. 2022-531482, 5 pages.

* cited by examiner

METHOD AND APPARATUS FOR DISPLAYING VIDEO PLAYBACK PAGE, AND ELECTRONIC DEVICE AND MEDIUM

CROSS-REFERENCE TO RELATED APPLICATIONS

The application is a continuation of International Application No. PCT/CN2020/127272, filed on Nov. 6, 2020, which claims priority to Chinese Patent Application No. 201911288907.1, filed on Dec. 12, 2019, both of the applications are hereby incorporated by reference in their entireties.

TECHNICAL FIELD

The present disclosure relates to the field of computer technology and, in particular, to a method and apparatus for displaying a video playback page, an electronic device and a medium.

BACKGROUND

The continuous popularization of electronic devices has greatly facilitated lives of people. People may use various electronic devices represented by smart phones and video applications installed thereon to perform various entertainment activities such as movie playback, music playback, and live watching, etc. Related video applications generally implement a video progress display and adjustment by adding controls such as a progress bar. Since the progress bar executes callback at intervals of a fixed duration, for a video with a relatively long duration, too many callbacks will affect a performance of the device, resulting in frequent freezes during video playback.

SUMMARY

A purpose of the present disclosure is to provide a method and apparatus for displaying a video playback page, an electronic device and a medium to solve the technical problems mentioned in the above background section.

In a first aspect, some embodiments of the present disclosure provide a method for displaying a video playback page, including: displaying the video playback page, where the video playback page includes a video playback view and a progress adjustment control for adjusting video playback progress; and updating a progress displayed in the progress adjustment control based on a playback progress of a currently played video in the video playback view at intervals of a target duration, where the target duration is determined based on a size of a screen of a video playback device and a total duration of the currently played video.

In a second aspect, some embodiments of the present disclosure provide an apparatus for displaying a video playback page, including: a displaying unit, configured to display the video playback page, where the video playback page includes a video playback view and a progress adjustment control for adjusting video playback progress; and an updating unit, configured to update a progress displayed in the progress adjustment control based on a playback progress of a currently played video in the video playback view at intervals of a target duration, where the target duration is determined based on a size of a screen of a video playback device and a total duration of the currently played video.

In a third aspect, some embodiments of the present disclosure provide an electronic device, including: one or more processors; and a storage apparatus having one or more programs stored thereon, and when the one or more programs are executed by the one or more processors, the one or more processors are caused to implement the method according to the first aspect.

In a fourth aspect, some embodiments of the present disclosure provide a computer-readable medium having a computer program stored thereon, where the program implements the method according to the first aspect when executed by a processor.

In a fifth aspect, some embodiments of the present disclosure provide a computer program including program code, and when a computer runs the computer program, the program code executes the method according to the first aspect.

An embodiment of the above-mentioned embodiments of the present disclosure has the following beneficial effects: a target duration is determined based on a size of a screen of a video playback device and a duration of a currently played video, so that callback duration differentiation between videos of different durations is realized, and a video freeze caused by setting a fixed callback duration is avoided.

DESCRIPTION OF EMBODIMENTS

Figure 1A:
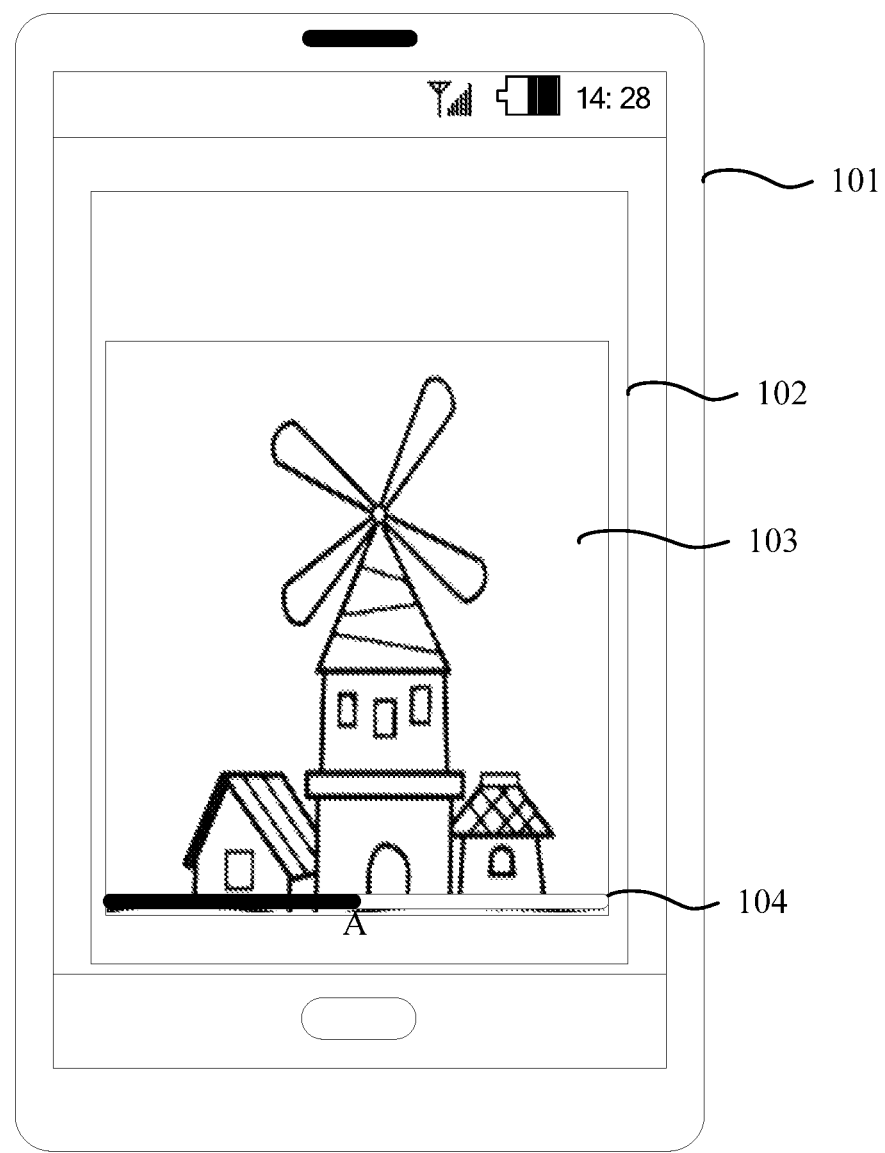
FIG. 1A-FIG. 1C are schematic diagrams of an application scenario of a method for displaying a video playback page according to some embodiments of the present disclosure.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein. Instead, these embodiments are provided for a more thorough and complete understanding of the present disclosure. It should be understood that the drawings and embodiments of the present disclosure are only used for illustrative purposes, rather than limiting the protection scope of the present disclosure.

In addition, it should be noted that, for ease of description, only a part related to the relevant invention is shown in the drawings. The embodiments in the present disclosure and the features in the embodiments can be combined with each other when there's no conflict.

It should be noted that the concepts of "first" and "second" mentioned in the present disclosure are only used to distinguish different apparatus, modules, or units rather than limiting an order or an interdependence of the functions performed by these apparatus, modules or units.

It should be noted that the modifiers of "one" and "multiple" mentioned in the present disclosure are illustrative rather than restrictive, and the person skilled in the art should understand that unless otherwise clearly indicated in the context, they should be interpreted as "one or more".

Names of messages or information exchanged between multiple apparatus in embodiments of the present disclosure are only for illustrative purposes rather than limiting the scope of these messages or information.

Hereinafter, the present disclosure will be described in detail with reference to the drawings and in conjunction with the embodiments.

Figure 1B:
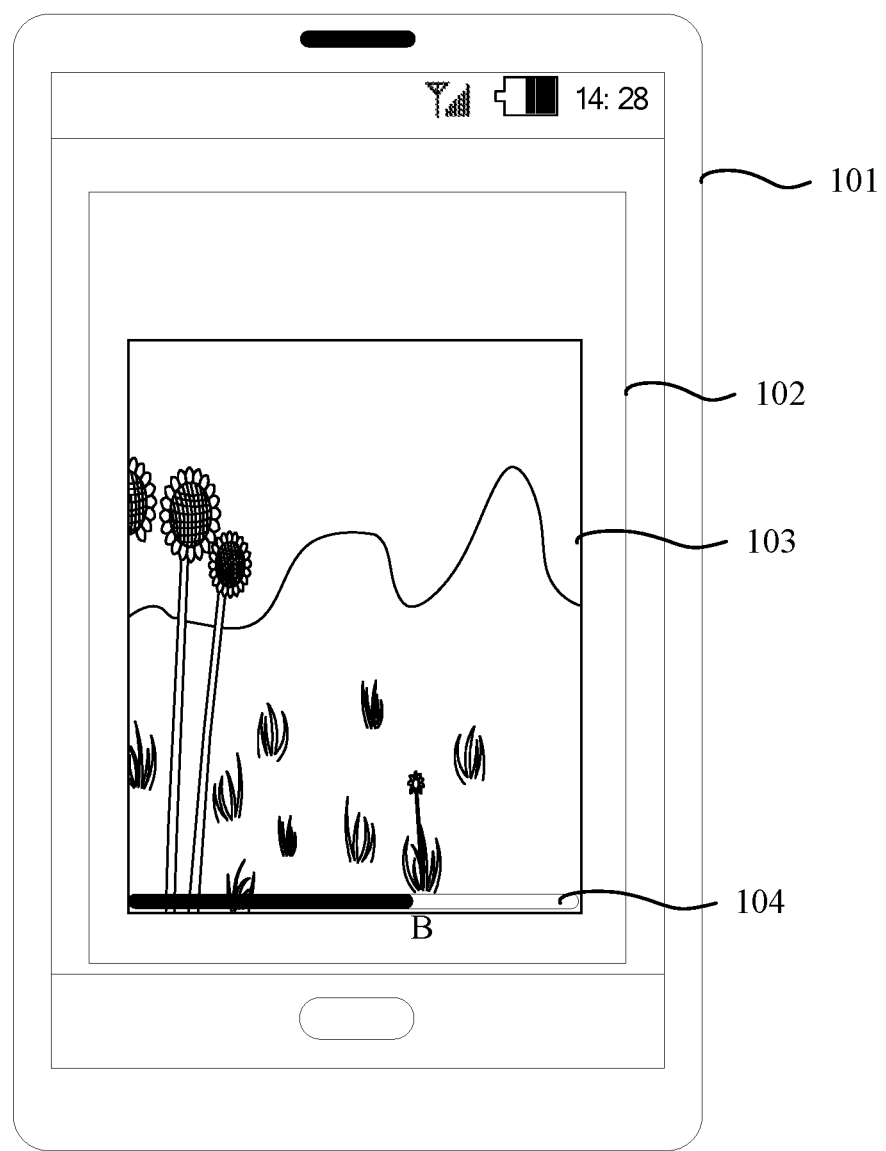
Figure 1C:
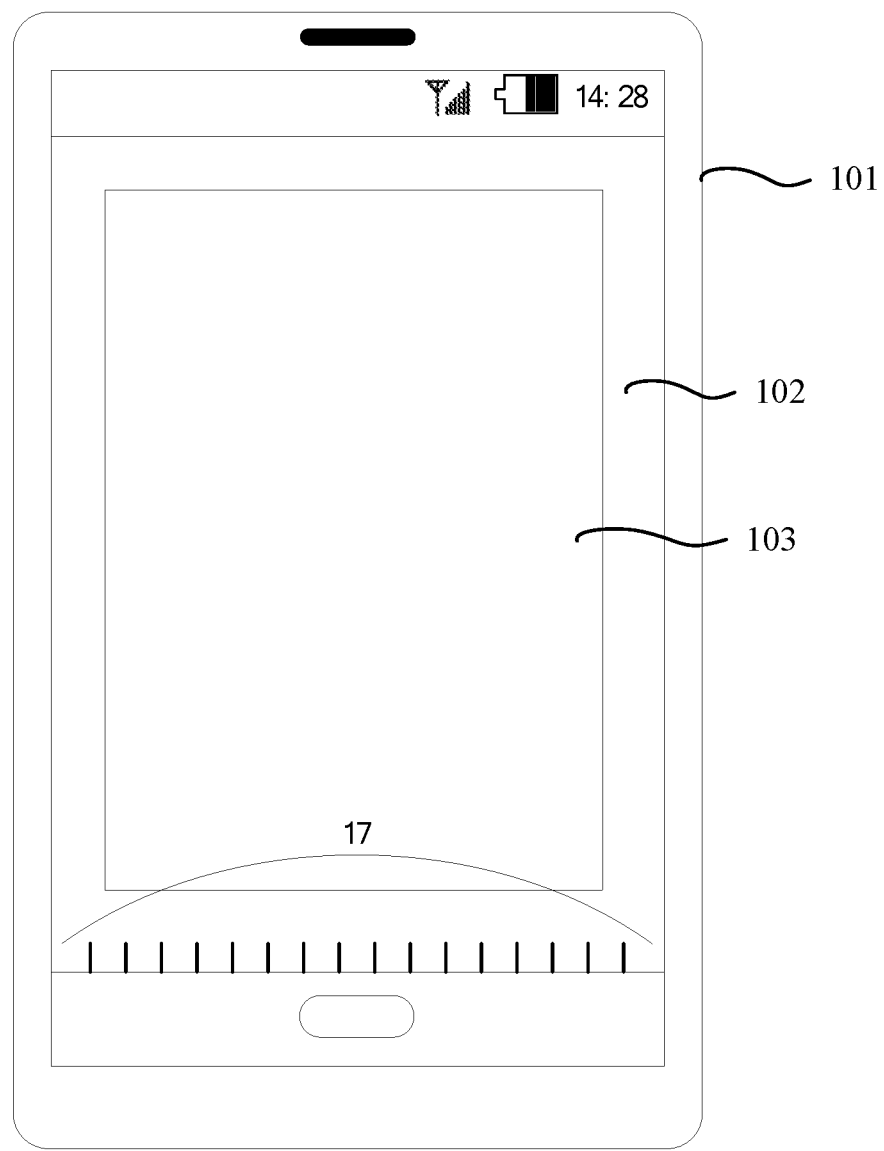

FIGS. 1A-1C are schematic diagrams of an application scenario of a method for displaying a video playback page according to some embodiments of the present disclosure.

The method for displaying a video playback page provided by some embodiments of the present disclosure is generally executed by a terminal device. It should be noted that the terminal device may be hardware or software. When the terminal device is hardware, it may be various electronic devices supporting video processing, including but not limited to a smart phone, a portable android device, an e-book reader, a vehicle-mounted terminal, etc. When the terminal device is software, it may be installed in the electronic devices listed above. It further may be implemented as multiple pieces of software or multiple software modules for providing a distributed service, or as a single piece of software or a single software module. There is no specific limitation here.

In the application scenarios shown in FIGS. 1A-1B, an executive entity of the method for displaying a video playback page may be a video stream viewing application installed on a smart phone 101. The video stream viewing application may display a video playback page 102, where the video playback page 102 includes a video playback view 103 and a progress adjustment control 104 for adjusting video playback progress. On this basis, a progress displayed in the progress adjustment control 104 may be updated based on a playback progress of a currently played video in video playback view 103 at intervals of a target duration. Take FIG. 1A as an example of a video playback page displayed by a video stream viewing application at time T, where a progress displayed in progress adjustment control 104 is at A. After the target duration, that is, at (T+target duration), the video playback page is as shown in FIG. 1B, where the progress displayed in progress adjustment control 104 is at B.

In this application scenario, as an example, the target duration may be obtained in the following way: a width of a screen of a video playback device is divided into N equal parts. After that, a total duration of a currently played video is divided by N to get the target duration. As shown in FIG. 1C, the width of the screen of smart phone 101 may be divided into 17 equal parts. Taking a total duration of the current played video of 34 seconds as an example, the target duration may be determined to be 2 seconds (34 divided by 17).

Figure 2:
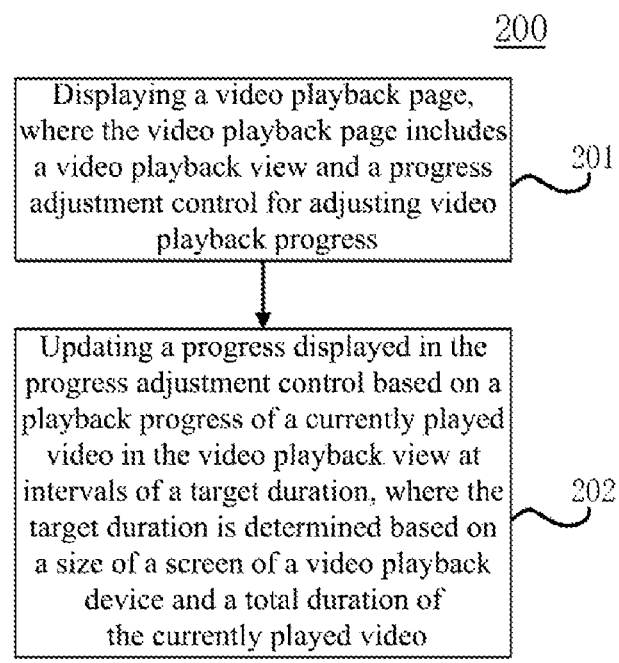
FIG. 2 is a flowchart of some embodiments of a method for displaying a video playback page according to the present disclosure.

Continuing to refer to FIG. 2, a process 200 of some embodiments of a method for displaying a video playback page according to the present disclosure is shown. The method for displaying a video playback page includes the following steps:

Step 201: displaying a video playback page, where the video playback page includes a video playback view and a progress adjustment control for adjusting video playback progress.

In some embodiments, an executive entity of the method for displaying a video playback page may display the video playback page, where the video playback page includes a video playback view and a progress adjustment control for adjusting video playback progress. In practice, the video playback view may be used for playing video. Both the video playback view and the progress adjustment control may be implemented through some functions or components provided by programming tools (such as, view or Progress Bar, etc.). The progress adjustment control may have various external manifestations, such as a progress bar, a progress ring, etc. Of course, other components or controls may also be included in the video playback page as required, for example, a user interaction control and the like.

Step 202: updating a progress displayed in the progress adjustment control based on a playback progress of a currently played video in the video playback view at intervals of a target duration, where the target duration is determined based on a size of a screen of a video playback device and a total duration of the currently played video.

In some embodiments, the above-mentioned executive entity may update the progress displayed in the progress adjustment control based on the playback progress of the currently played video in the video playback view at intervals of the target duration. In practice, the playback progress of the currently played video in the video playback view may be represented by corresponding parameters of the video playback view. These parameters thus may be read to obtain the playback progress of the currently played video. On this basis, the progress displayed in the progress adjustment control may be updated to match the playback progress. For example, a callback may be executed every target duration, that is, the progress displayed in the progress adjustment control may be updated based on the playback progress of the currently played video in the video playback view. For example, if the playback progress obtained at a certain time is 50%, the progress displayed in the progress adjustment control is also updated to 50%.

In some embodiments, the target duration may be determined based on a size of a screen of a video playback device and a total duration of the currently played video. For example, a width of the screen of the video playback device may be divided into N equal parts, where the number of parts, N, may be calculated or queried according to the width of the screen. The total duration of the currently played video then is divided by N to obtain the target duration. In this way, a dynamic matching between the target duration and the screen size is achieved, thereby avoiding performance degradation that may be caused by a fixed target duration and reducing video freezes.

In some implementations of some embodiments, the target duration is calculated through the following steps: obtaining the total duration of the currently played video; determining a display direction of the currently played video; determining a length of the screen of the video playback device based on the display direction; and determining the target duration based on the length of the screen and the total duration of the currently played video.

Figure 3A:
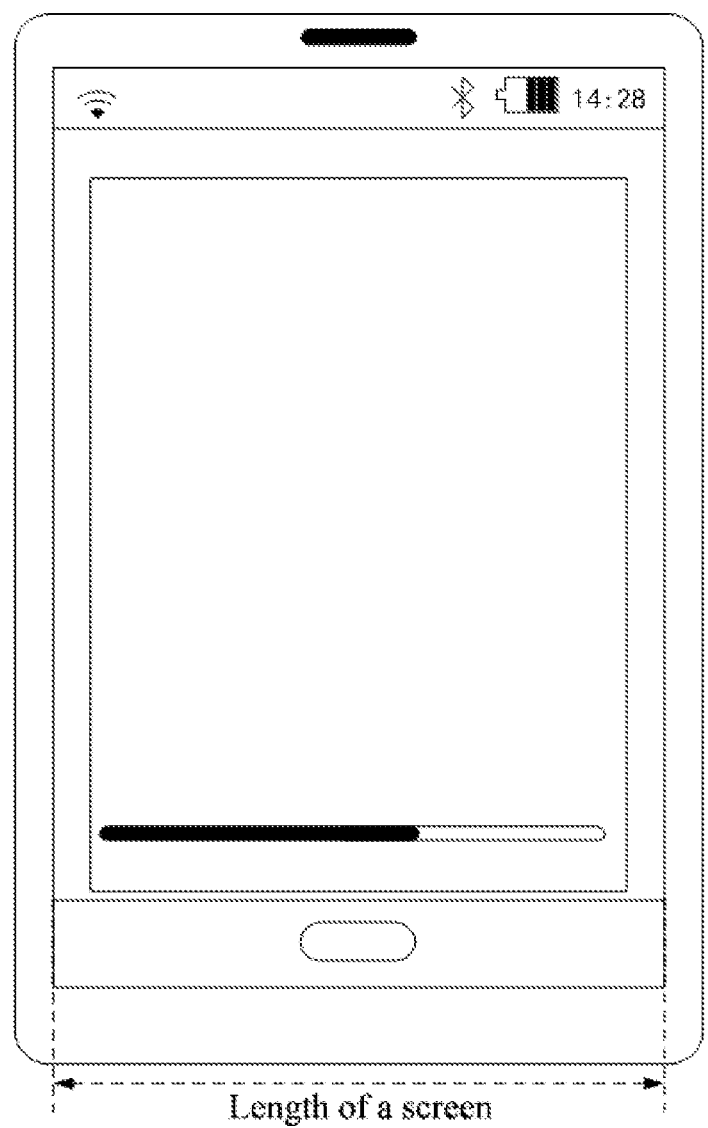
FIG. 3A and FIG. 3B show some examples of lengths of screens corresponding to different display directions.
Figure 3B:
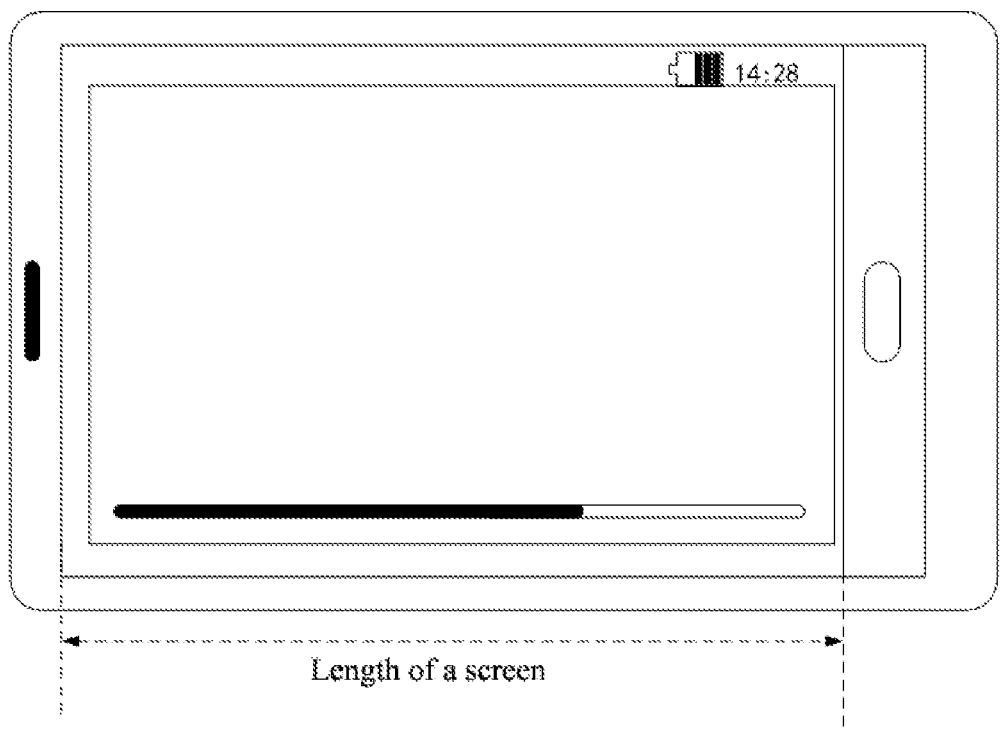

In these implementations, an executive entity of the steps for calculating the target duration may be the same as or different from the executive entity for displaying the video playback page, which is not limited in the present disclosure. The executive entity of the calculating steps may first obtain the total duration of the currently played video by reading a video file or the like. In addition, the display direction of the currently played video may also be determined. The display direction of the currently played video may be vertical or horizontal. On this basis, the length of the screen of the video playback device may be determined according to the display direction. In practice, when the display directions of videos are different, the length of the screen may be a width of the screen or a height of the screen. As an example, reference may be made to FIG. 3A and FIG. 3B, which illustrate the lengths of the screens corresponding to different display directions. The target duration is then determined based on the determined length of the screen and the total duration. Specifically, the length of the screen of the video playback device is divided into N equal parts. Then, the total duration of the currently played video is divided by N to obtain the target duration.

In the method for displaying a video playback page provided by some embodiments of the present disclosure, a target duration is determined based on a size of a screen of a video playback device and a duration of a currently played video, so that callback duration differentiation between videos of different durations is realized, and a video freeze caused by setting a fixed callback duration is avoided.

Figure 4:
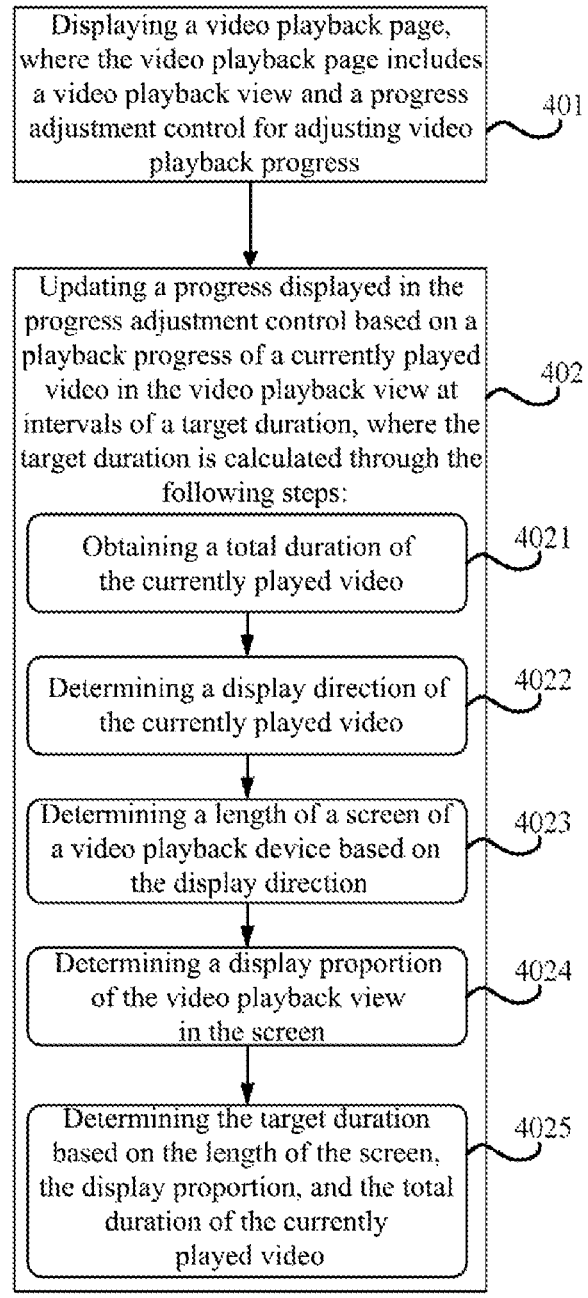
FIG. 4 is a flowchart of some other embodiments of a method for displaying a video playback page according to the present disclosure.

Further refer to FIG. 4, which shows a process 400 of some other embodiments of a method for display a video playback page. The process 400 of the method for displaying a video playback page includes the following steps:

Step 401, displaying a video playback page, where the video playback page includes a video playback view and a progress adjustment control for adjusting video playback progress.

Step 402: updating a progress displayed in the progress adjustment control based on a playback progress of a currently played video in the video playback view at intervals of a target duration, where the target duration is calculated through the following steps:

Step 4021: obtaining a total duration of the currently played video.

Step 4022: determining a display direction of the currently played video.

Step 4023: determining a length of a screen of a video playback device based on the display direction.

In some embodiments, for step 401 and steps 4021-4023 in step 402, reference may be made to those embodiments corresponding to FIG. 2, which will not be repeated herein.

Step 4024: determining a display proportion of the video playback view in the screen.

In some embodiments, the executive entity of the method for displaying a video playback page may determine the display proportion of the video playback view in the screen. In practice, a user may adjust the display proportion of the video playback view in the screen as needed. As an example, the video playback view may be displayed at a proportion of 100%, 75%, 50%, etc.

Step 4025: determining the target duration based on the length of the screen, the display proportion, and the total duration of the currently played video.

In some embodiments, the above-mentioned executive entity may determine the target duration based on the length of the screen, the display proportion, and the total duration of the currently played video. As an example, an equivalent length of the screen may be determined according to the display proportion. For example, a product of the length of the screen and the display proportion may be calculated to obtain the equivalent length of the screen. On this basis, the number of screen division parts N is determined according to the equivalent length of the screen. The number of screen division parts may be obtained by querying a corresponding correspondence table according to the equivalent length of the screen. A length and a corresponding number of screen division parts are relevantly stored in the correspondence table. Of course, the number of screen division parts may also be calculated by a pre-specified formula as needed. Therefore, the target duration may be obtained by dividing the total duration S by the number of parts N. For example, the length of the screen is L, the display proportion is 50%, and the equivalent length of the screen is 0.5*L. The number of screen division parts N is determined by querying. Therefore, the target duration may be obtained by dividing the total duration S by the number of parts N.

In some implementations of some embodiments, before the determining the target duration based on the length of the screen and the total duration of the currently played video, the calculating steps further include: receiving a progress updating mode entered by a user; and the determining the target duration based on the length of the screen and the total duration of the currently played video includes: determining a candidate target duration based on the length of the screen and the total duration of the currently played video; and adjusting the candidate target duration based on the progress updating mode to obtain the target duration. In these implementations, the user may enter a progress updating mode so that different user needs can be accommodated.

It can be seen from FIG. 4, compared with the description of some embodiments corresponding to FIG. 2, the display proportion of the video playback view in the screen is determined, and the target duration is determined based on the display proportion. In this way, the display proportion of the view is considered, so that the determined target duration is matched better with an actual situation, and accuracy is improved.

Figure 5:
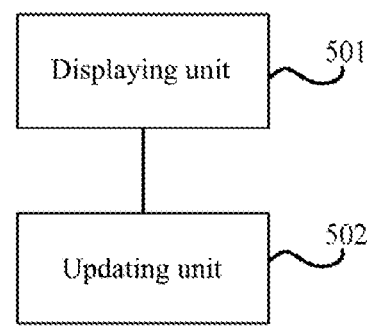
FIG. 5 is a schematic structural diagram of some embodiments of an apparatus for displaying a video playback page according to the present disclosure.

Further referring to FIG. 5, as an implementation of the methods shown in the above-mentioned figures, the present disclosure provides some embodiments of an apparatus for displaying a video playback page. These apparatus embodiments correspond to those method embodiments shown in FIG. 2. The apparatus may be specifically applied to various electronic devices.

As shown in FIG. 5, an apparatus for displaying a video playback page 500 in some embodiments includes: a displaying unit 501 and an updating unit 502. The displaying unit 501 is configured to display the video playback page, where the video playback page includes a video playback view and a progress adjustment control for adjusting video playback progress; and the updating unit 502 is configured to update a progress displayed in the progress adjustment control based on a playback progress of a currently played video in the video playback view at intervals of a target duration, where the target duration is determined based on a size of a screen of a video playback device and a total duration of the currently played video.

In an implementation of some embodiments, the target duration is calculated through the following steps: obtaining the total duration of the currently played video; determining a display direction of the currently played video; determining a length of the screen of video playback device based on the display direction; and determining the target duration based on the length of the screen and the total duration of the currently played video.

In an implementation manner of some embodiments, before the determining the target duration based on the length of the screen and the total duration of the currently played video, the calculating steps further include: determining a display proportion of the video display view in the screen; and the determining the target duration based on the length of the screen and the total duration of the currently played video includes: determining the target duration based on the length of the screen, the display proportion, and the total duration of the currently played video.

In an implementation manner of some embodiments, before the determining the target duration based on the length of the screen and the total duration of the currently played video, the calculating steps further include: receiving a progress updating mode entered by a user; and the determining the target duration based on the length of the screen and the total duration of the currently played video includes: determining a candidate target duration based on the length of the screen and the total duration of the currently played video; and adjusting the candidate target duration based on the progress updating mode to obtain the target duration.

In some embodiments, the target duration is determined based on a size of a screen of a video playback device and a duration of a currently played video, so that callback duration differentiation between videos of different durations is realized, and a video freeze caused by setting a fixed callback duration is avoided.

In the following, reference is made to FIG. 6, which shows a schematic structural diagram of an electronic device 600 (e.g., the terminal device in FIG. 1) suitable for implementing some embodiments of the present disclosure. The electronic device in some embodiments of the present disclosure may include, but are not limited to, mobile terminals such as a mobile phone, a notebook computer, a digital broadcast receiver, a PDA (personal digital assistants), a PAD (portable android device), a PMP (portable multimedia player), a vehicle-mounted terminal (such as a vehicle navigation terminal), etc., and stationary terminals such as a digital TV, a desktop computer, etc. The electronic device shown in FIG. 6 is only an example, which should not impose any limitation on the function and applying scope of the embodiments of the present disclosure.

Figure 6:
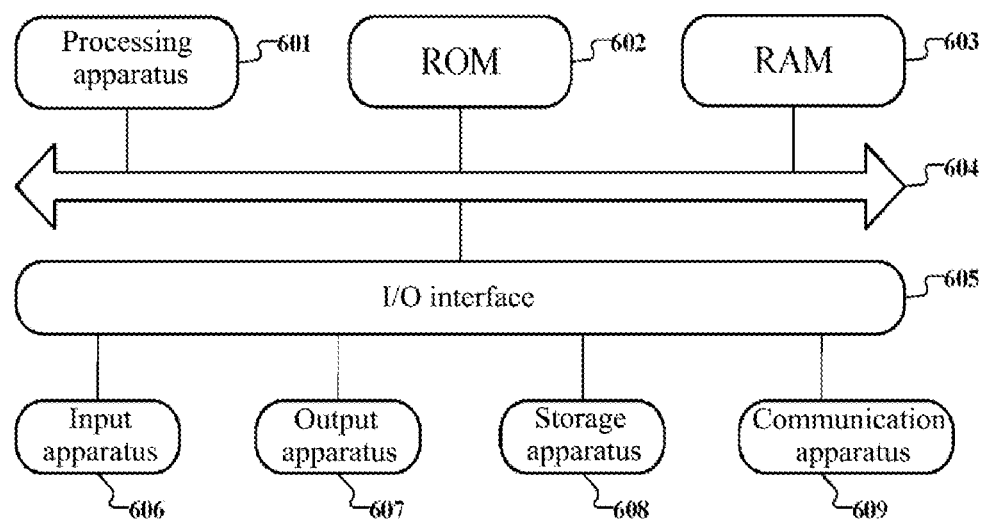
FIG. 6 is a schematic structural diagram of an electronic device suitable for implementing some embodiments of the present disclosure.

As shown in FIG. 6, an electronic device 600 may include a processing apparatus (e.g., a central processing unit, a graphics processor, etc.) 601 that that may perform various appropriate actions and processes according to a program stored in a read only memory (ROM) 602 or a program loaded from a storage apparatus 608 into a random access memory (RAM) 603. Various programs and data necessary for the operation of the electronic device 600 are further stored in the RAM 603. The processing apparatus 601, ROM 602, and RAM 603 are connected to each other through a bus 604. And an input/output (I/O) interface 605 is also connected to the bus 604.

Generally, the following apparatuses may be connected to the I/O interface 605: an input apparatus 606 including, for example, a touch screen, a touchpad, a keyboard, a mouse, a camera, a microphone, an accelerometer, a gyroscope, etc.; an output apparatus 607 including, for example, a liquid crystal display (LCD), a speaker, a vibration, etc.; a storage apparatus 608 including, for example, a memory card; and a communication apparatus 609. The communication apparatus 609 may allow the electronic device 600 to communicate wirelessly or by wire with other devices to exchange data. Although FIG. 6 shows the electronic device 600 having various apparatus, it should be understood that not all of the illustrated apparatuses are required to be implemented or provided. More or fewer apparatuses may alternatively be implemented or provided. Each block shown in FIG. 6 may represent one apparatus, or may represent multiple apparatuses as required.

Specially, according to some embodiments of the present disclosure, the processes described above with reference to the flowcharts may be implemented as a computer software program. For example, some embodiments of the present disclosure include a computer program product including a computer program carried on a computer-readable medium, where the computer program includes program code for performing the method illustrated in the flowchart. In some such embodiments, the computer program may be downloaded and installed from a network via the communication apparatus 609, or installed from the storage apparatus 608, or installed from the ROM 602. When the computer program is executed by the processing apparatus 601, the abovementioned function defined in the methods of some embodiments of the present disclosure are performed.

It should be noted that the computer-readable medium described in some embodiments of the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer readable storage media may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In some embodiments of the present disclosure, the computer-readable storage medium may be any tangible medium that includes or stores a program that may be used by or used in combination with an instruction execution system, apparatus, or device. And in some embodiments of the present disclosure, the computer-readable signal medium may include a data signal propagated in baseband or as part of a carrier wave, carrying computer-readable program code therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program code included on the computer readable medium may be transmitted through any suitable medium including, but not limited to, an electrical wire, an optical fiber cable, an RF (radio frequency), etc., or any suitable combination thereof.

In some embodiments, a client and server may use any currently known or future developed network protocol such as HTTP (HyperText Transfer Protocol) to communicate, and may be interconnected with any form or medium of digital data communication (e.g., a communication network). Examples of the communication network include a local area network (LAN), a wide area network (WAN), an internet (e.g., the Internet), and a peer-to-peer network (e.g., an ad hoc peer-to-peer network), as well as any currently known or future developed network.

The above-mentioned computer-readable medium may be included in the above-mentioned electronic device; or may exist alone without being assembled into the electronic device. The above-mentioned computer-readable medium carries one or more programs, and when the above-mentioned one or more programs are executed by the electronic device, the electronic device is caused to: display a video playback page, where the video playback page includes a video playback view and a progress adjustment control for adjusting video playback progress; and update a progress displayed in the progress adjustment control based on a playback progress of a currently played video in the video playback view in intervals of a target duration, where the target duration is determined based on a size of a screen of a video playback device and a total duration of the currently played video.

The computer program code for performing an operation of some embodiments of the present disclosure may be written in one or more programming languages or a combination thereof, where the programming languages include an object-oriented programming language, such as Java, Smalltalk, and C++, as well as a conventional procedural programming language, such as "C" or similar programming languages. The program code may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (LAN) or a wide area network (WAN), or may be connected to an external computer (e.g., connected via the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in the reverse order, depending upon the functionality involved. It also should be noted that each block of the block diagrams and/or flowcharts, or a combination of blocks in the block diagrams and/or flowcharts may be implemented in a special purpose hardware-based system that perform a specified function or operation, or may be implemented in a combination of special purpose hardware and a computer instruction.

The units described in some embodiments of the present disclosure may be implemented by means of software, and may also be implemented by means of hardware. The described unit may also be provided in a processor, for example, it can be described as: a processor includes a displaying unit and an updating unit. Among them, names of these units do not constitute a limitation on the units pe se under certain circumstances, for example, the displaying unit may also be described as "a unit for displaying a video playback page".

The foregoing functions described herein may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and more.

According to one or more embodiments of the present disclosure, a method for displaying a video playback page is provided, including: displaying the video playback page, where the video playback page includes a video playback view and a progress adjustment control for adjusting video playback progress; and updating a progress displayed in the progress adjustment control based on a playback progress of a currently played video in the video playback view at intervals of a target duration, where the target duration is determined based on a size of a screen of a video playback device and a total duration of the currently played video.

According to one or more embodiments of the present disclosure, the target duration is calculated through the following steps: obtaining the total duration of the currently played video; determining a display direction of the currently played video; determining a length of the screen of the video playback device based on the display direction; and determining the target duration based on the length of the screen and the total duration of the currently played video.

According to one or more embodiments of the present disclosure, before the determining the target duration based on the length of the screen and the total duration of the currently played video, the calculating steps further include: determining a display proportion of the video display view in the screen; and the determining the target duration based on the length of the screen and the total duration of the currently played video includes: determining the target duration based on the length of the screen, the display proportion, and the total duration of the currently played video.

According to one or more embodiments of the present disclosure, before the determining the target duration based on the length of the screen and the total duration of the currently played video, the calculating steps further include: receiving a progress updating mode entered by a user; and the determining the target duration based on the length of the screen and the total duration of the currently played video includes: determining a candidate target duration based on the length of the screen and the total duration of the currently played video; and adjusting the candidate target duration based on the progress updating mode to obtain the target duration.

According to one or more embodiments of the present disclosure, an apparatus for displaying a video playback page is provided, including: a displaying unit, configured to display the video playback page, where the video playback page includes a video playback view and a progress adjustment control for adjusting video playback progress; and an updating unit, configured to update a progress displayed in the progress adjustment control based on a playback progress of a currently played video in the video playback view at intervals of a target duration, where the target duration is determined based on a size of a screen of a video playback device and a total duration of the currently played video.

According to one or more embodiments of the present disclosure, the target duration is calculated through the following steps: obtaining the total duration of the currently played video; determining a display direction of the currently played video; determining a length of the screen of the video playback device based on the display direction; and determining the target duration based on the length of the screen and the total duration of the currently played video.

According to one or more embodiments of the present disclosure, before the determining the target duration based on the length of the screen and the total duration of the currently played video, the calculating steps further include: determining a display proportion of the video display view in the screen; and the determining the target duration based on the length of the screen and the total duration of the currently played video includes: determining the target duration based on the length of the screen, the display proportion, and the total duration of the currently played video.

According to one or more embodiments of the present disclosure, before the determining the target duration based on the length of the screen and the total duration of the currently played video, the calculating steps further include:

receiving a progress updating mode entered by a user; and
the determining the target duration based on the length of the screen and the total duration of the currently played video includes: determining a candidate target duration based on the length of the screen and the total duration of the currently played video; and adjusting the candidate target duration based on the progress updating mode to obtain the target duration.

According to one or more embodiments of the present disclosure, an electronic device is provided, including: one or more processors; and a storage apparatus having one or more programs stored thereon, and when the one or more programs are executed by the one or more processors, the one or more processors are caused to implement any one of the above methods.

According to one or more embodiments of the present disclosure, a computer-readable medium having a computer program stored thereon is provided, where the program implements any one of the above methods when executed by a processor.

According to one or more embodiments of the present disclosure, there is provided a computer program including program code, and when a computer runs the computer program, the program code executes the method described in any one of the above embodiments.

The above descriptions are merely some preferred embodiments of the present disclosure and illustrations of an applied technical principle. The person skilled in the art should understand that a scope of the invention involved in the embodiments of the present disclosure is not limited to the technical solution formed by the specific combination of the above-mentioned technical features, and should also cover other technical solutions formed by any combination of the above technical features or their equivalents without departing from the above inventive concept. For example, a technical solution formed by replacing the above features with the technical features with similar functions disclosed in the embodiments of the present disclosure (but not limited to).

What is claimed is:

1. A method for displaying a video playback page, comprising:

displaying the video playback page, wherein the video playback page comprises a video playback view and a progress adjustment control for adjusting video playback progress; and updating a progress displayed in the progress adjustment control based on a playback progress of a currently played video in the video playback view at intervals of a target duration, wherein the target duration is determined based on a size of a screen of a video playback device and a total duration of the currently played video;

wherein the target duration is obtained by performing a calculating step, and the calculating step comprises:

obtaining the total duration of the currently played video; and dividing the total duration of the currently played video by a number of division parts to obtain the target duration, wherein the number of division parts is calculated or queried according to the size of the screen;

wherein before the dividing the total duration of the currently played video by the number of division parts to obtain the target duration, the calculating step further comprises:

determining a display direction of the currently played video; and determining the size of the screen of the video playback device based on the display direction;

wherein after the determining the size of the screen of the video playback device based on the display direction, the calculating step further comprises:

determining a display proportion of the video playback view in the screen; and receiving a progress updating mode entered by a user;

the dividing the total duration of the currently played video by the number of division parts to obtain the target duration comprises:

determining an equivalent length of the screen according to the display proportion;

obtaining the number of division parts by querying a corresponding correspondence table according to the equivalent length of the screen;

determining a candidate target duration based on the obtained number of division parts and the total duration of the currently played video; and adjusting the candidate target duration based on the progress updating mode to obtain the target duration.

2. An electronic device, comprising:

one or more processors; and a storage apparatus having one or more programs stored thereon, wherein, when the one or more programs are executed by the one or more processors, the one or more processors are caused to:

display a video playback page, wherein the video playback page comprises a video playback view and a progress adjustment control for adjusting video playback progress; and update a progress displayed in the progress adjustment control based on a playback progress of a currently played video in the video playback view at intervals of a target duration, wherein the target duration is determined based on a size of a screen of a video playback device and a total duration of the currently played video;

wherein the one or more processors are further caused to:

obtain the total duration of the currently played video; and divide the total duration of the currently played video by a number of division parts to obtain the target duration, wherein the number of division parts is calculated or queried according to the size of the screen;

wherein the one or more processors are further caused to:

determine a display direction of the currently played video;

determine the size of the screen of the video playback device based on the display direction;

determine a display proportion of the video playback view in the screen;
receive a progress updating mode entered by a user;
determine an equivalent length of the screen according to the display proportion;
obtain the number of division parts querying a corresponding correspondence table according to the equivalent length of the screen;
determine a candidate target duration based on the obtained number of division parts and the total duration of the currently played video; and
adjust the candidate target duration based on the progress updating mode to obtain the target duration.

3. A non-transitory computer-readable medium having a computer program stored thereon, wherein when the program is executed by a processor, the processor is caused to:
display a video playback page, wherein the video playback page comprises a video playback view and a progress adjustment control for adjusting video playback progress; and
update a progress displayed in the progress adjustment control based on a playback progress of a currently played video in the video playback view at intervals of a target duration, wherein the target duration is determined based on a size of a screen of a video playback device and a total duration of the currently played video;
wherein the processor is further caused to:
obtain the total duration of the currently played video; and
divide the total duration of the currently played video by a number of division parts to obtain the target duration, wherein the number of division parts is calculated or queried according to the size of the screen;
wherein when the program is executed by the processor, the processor is further caused to:
determine a display direction of the currently played video;
determine the size of the screen of the video playback device based on the display direction;
determine a display proportion of the video playback view in the screen;
receive a progress updating mode entered by a user;
determine an equivalent length of the screen according to the display proportion;
obtain the number of division parts querying a corresponding correspondence table according to the equivalent length of the screen;
determine a candidate target duration based on the obtained number of division parts and the total duration of the currently played video; and
adjust the candidate target duration based on the progress updating mode to obtain the target duration.

* * * * *